United States Patent [19]

Takeda

[11] Patent Number: 5,322,347
[45] Date of Patent: Jun. 21, 1994

[54] HEAD REST APPARATUS

[75] Inventor: Nobuhiko Takeda, Obu, Japan

[73] Assignee: Aisin Seiki Kabushiki Kaisha, Asahi, Japan

[21] Appl. No.: 948,564

[22] Filed: Sep. 23, 1992

[30] Foreign Application Priority Data

Sep. 24, 1991 [JP] Japan .................... 3-243564

[51] Int. Cl.⁵ .............................. A47C 1/10
[52] U.S. Cl. .................... 297/410; 297/396
[58] Field of Search ............ 297/410, 391, 396

[56] References Cited

U.S. PATENT DOCUMENTS

| | | | |
|---|---|---|---|
| 3,471,198 | 10/1969 | Homier et al. | 297/410 |
| 4,606,578 | 8/1986 | Yasui | 297/410 X |
| 4,637,655 | 1/1987 | Fourrey et al. | 297/410 |
| 4,657,304 | 4/1987 | Heesch et al. | 297/391 |
| 4,762,367 | 8/1988 | Denton | 297/391 X |
| 4,923,250 | 5/1990 | Hattori | 297/410 |
| 5,026,120 | 6/1991 | Takeda et al. | 297/410 X |
| 5,131,720 | 7/1992 | Nemoto | 297/410 |

FOREIGN PATENT DOCUMENTS

| | | | |
|---|---|---|---|
| 2925781 | 1/1981 | Fed. Rep. of Germany | 297/410 |
| 3141515 | 4/1983 | Fed. Rep. of Germany | 297/410 |
| 0244632 | 12/1985 | Japan | 297/410 |
| 0198532 | 9/1987 | Japan | 297/410 |
| 2008937 | 6/1979 | United Kingdom | 297/391 |

*Primary Examiner*—Lloyd A. Gall
*Attorney, Agent, or Firm*—Finnegan, Henderson, Farabow, Garrett and Dunner

[57] ABSTRACT

A head rest apparatus comprises a sole stay, a head rest main body movably supported on the sole stay, a guide rod fixed in the head rest main body, a rail disposed in the head rest main body and fixed on the sole stay, a guide member slidably supported on the guide rod and the rail, a screw rotatably supported in the head rest main body, a nut supported on the rail and engaged with the screw, a cushion disposed between the rail and the nut, and a motor connected to the screw or the nut. A load imparted to the head rest main body is absorbed by the sliding movement of the guide member and the distortion of the cushion.

6 Claims, 3 Drawing Sheets

HEAD REST APPARATUS

BACKGROUND OF THE INVENTION

1. Field of the Invention

This invention relates to a head rest apparatus, and more particularly to a head rest apparatus including a driving mechanism for moving a head rest main body by a nut and a screw.

2. Description of the Related Art

A head rest apparatus is disclosed in Japanese Utility Model Laid Open Publication No. 2(1990)-61233 published without examination on May 8, 1990.

This head rest apparatus includes a stay means fixed on a seat back, a head rest main body movably supported on the stay means in the vertical direction, a bracket disposed in the head rest main body and fixed to the stay means, a screw fixed in the head rest main body, a nut rotatably supported on the bracket and engaged with the screw, and a motor disposed in the head rest main body and connected to the nut for moving a head rest. The head rest main body is moved relative to the seat back in response to the movement of the screw by the nut which is in turn rotated by the motor. Therefore, a position of the head rest main body is adjusted relative to the seat back.

However, in the conventional structure as mentioned above, if a force is applied excessively to an engaged portion between the nut and the screw, the engaged portion will be damaged, thereby disturbing further smooth relative movement between the nut and the screw, which leads to a malfunction of the height adjustment of the head rest apparatus.

OBJECT AND SUMMARY OF THE PRESENT INVENTION

It is, therefore, a primary object of the present invention to provide a head rest apparatus which obviate the above mentioned drawbacks.

It is another object of the present invention to provide a head rest apparatus which increases the flexibility in a seat design.

In order to accomplish the foregoing object, the present invention provides a head rest apparatus comprising a sole stay, a head rest main body movably supported on the sole stay, guide rod means fixed to the head rest main body, a rail disposed in the head rest main body and fixed on the sole stay, guide member means slidably supported on the guide rod means and the rail, a screw rotatably supported in the head rest main body, a nut supported on the rail and engaged with the screw, a cushion disposed between the rail and the nut, and a motor connected to the screw or the nut.

BRIEF DESCRIPTION OF THE DRAWINGS

These and other objects, features and advantages of the present invention will become more apparent on reading the following detailed description with reference to the accompanying drawings, wherein like members bear like reference numerals, and wherein.

DETAILED DESCRIPTION OF THE PREFERRED EMBODIMENT

Figure 1:
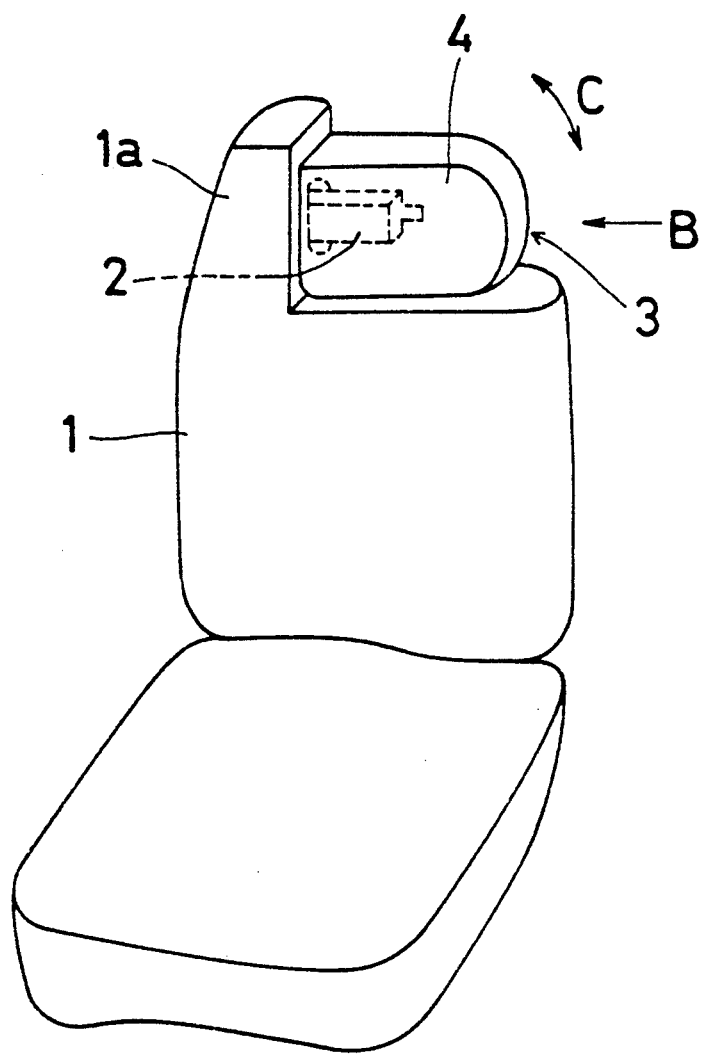
FIG. 1 is a perspective view of a seat device having a head rest apparatus according to the present invention.
Figure 2:
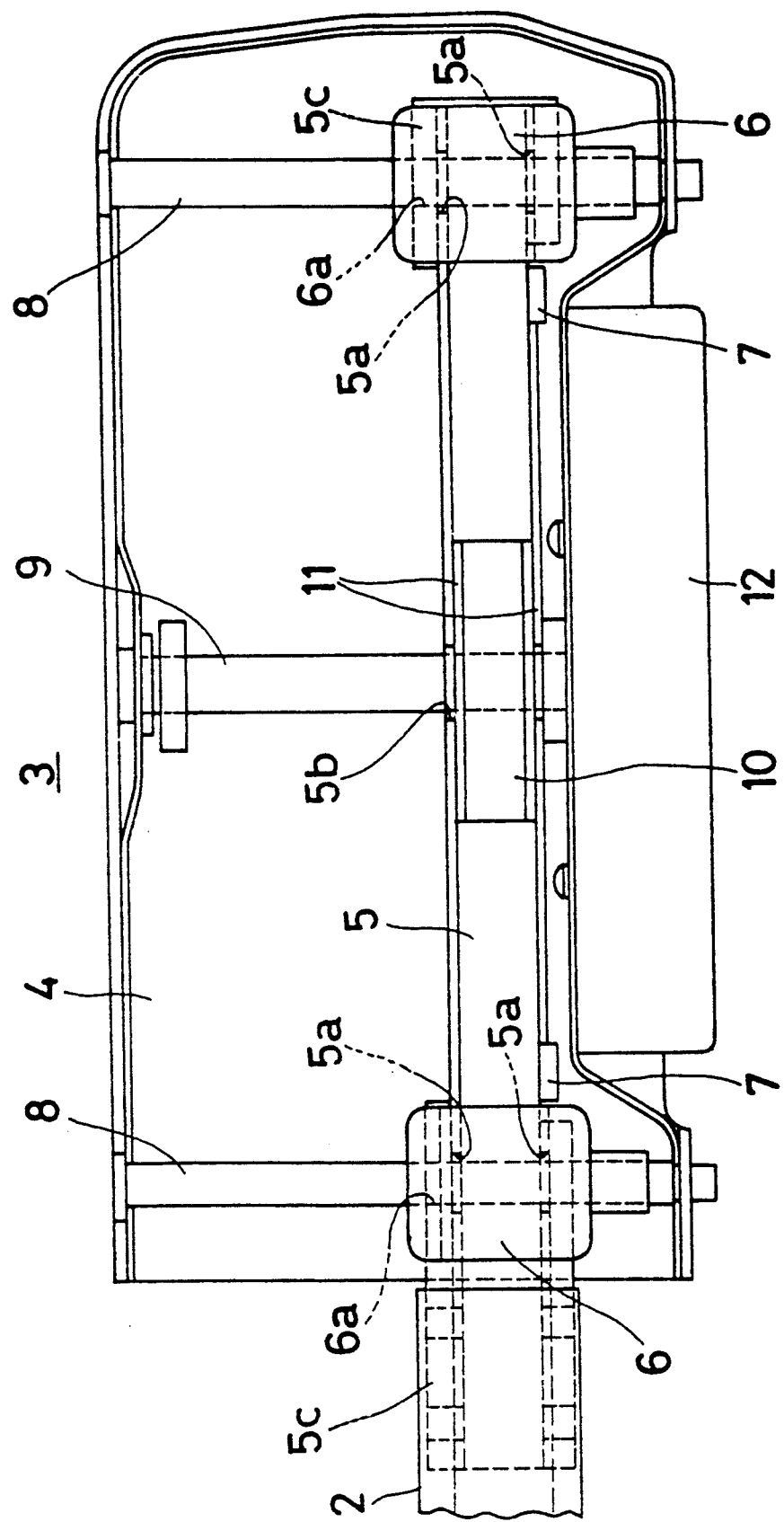
FIG. 2 is a front view of the head rest apparatus of FIG. 1.
Figure 3:
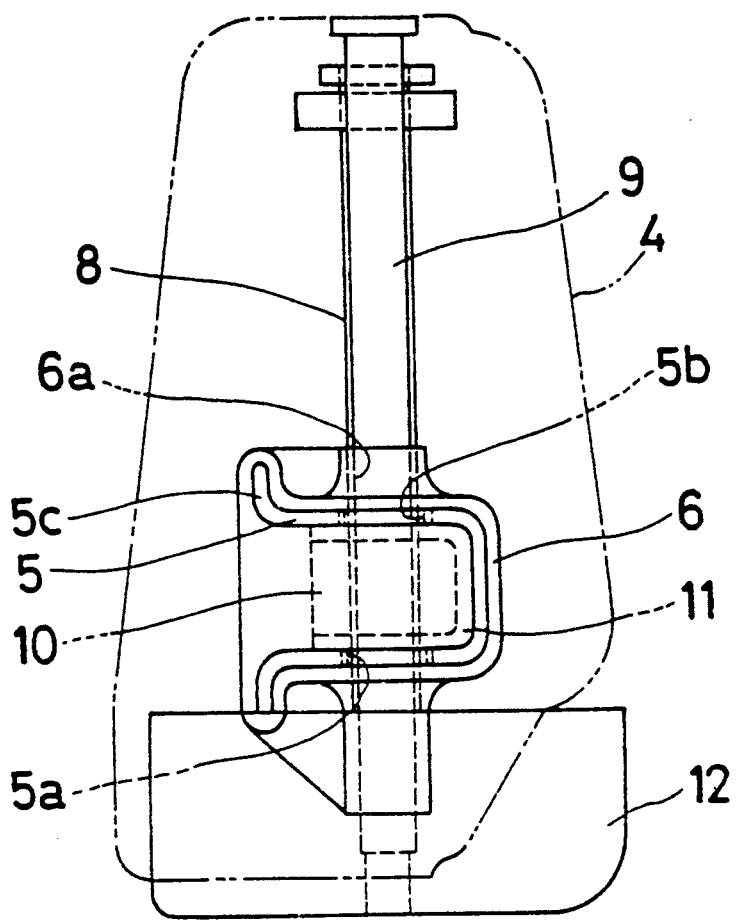
FIG. 3 is a side view of the head rest apparatus of FIG. 1.
Figure 4:
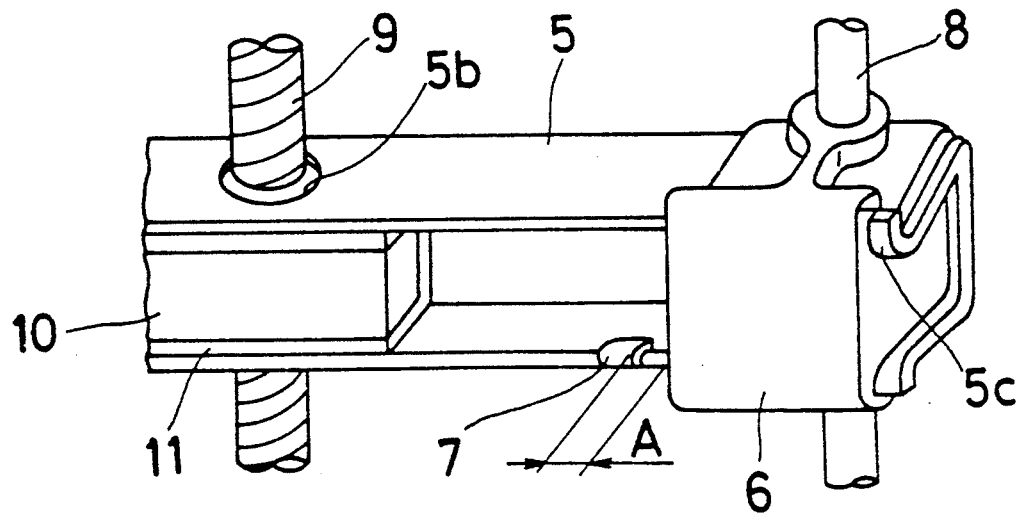
FIG. 4 is a perspective enlarged view showing a characterized portion of the head rest apparatus of FIG. 1.

An embodiment of the present invention will be described hereinafter with reference to FIGS. 1 to 4 inclusive. A head rest apparatus 3 is mounted on a seat back 1 and has a sole stay 2 and a head rest main body 4. An extension portion 1a which extends in the upward direction is formed at one side of an upper portion of the seat back 1. The sole stay 2 is fixed to a side of the extension portion 1a. The head rest main body 4 is movably supported on the sole stay 2 in the vertical direction and arranged on the side of extension portion 1a.

A rail 5 of U-shaped cross-section is disposed in the head rest main body 4 so as to extend in the horizontal direction. One end of the rail 5 is fixed to the sole stay 2. Vertically extending flanges 5c are formed on the rail 5 near both ends thereof. A pair of guide members 6 are slidably supported on the rail 5 near both ends thereof. A pair of stoppers 7 are fixed adjacent the flanges 5c of the rail 5 and limit a sliding of the guide member 6 which exceeds a determined distance A. A pair of guide rods 8 are fixed in the head rest main body 4 so as to extend in the vertical direction and are slidably supported on the rail 5 through the guide members 6. A pair of first through holes 5a are formed in the rail 5 while a pair of second through holes 6a are formed in the guide members 6. The guide rods 8 are inserted in the first through holes 5a of the rail 5 and the second through hole 6a of the guide members 6 respectively. The diameter of the first through hole 5a is bigger than the diameter of the guide rod 8 so as to permit the sliding or shifting movement of the guide member 6 relative to the rail 5. The diameter of the second through hole 6a is approximately equal to the diameter of the guide rod 8 so as to permit the sliding movement of the guide member 6 along the guide rod 8.

A screw 9 is rotatably supported in the head rest main body 4 and is arranged between the guide rods 8. A nut 10 is fixedly mounted on the rail 5 through a cushion 11 and threadably engages with the screw 9. A third through hole 5b is formed in the rail 5 to receive the screw 9 therein. The diameter of the third through hole 5b is bigger than the diameter of the screw 9 so as to permit the sliding or shifting movement of the guide member 6 relative to the rail 5. The screw 9 is connected to an ultrasonic motor 12 which is disposed in the head rest main body 4.

The operation of the head rest apparatus 3 will be explained as follows:

When the screw 9 is rotated according to an operation of the ultrasonic motor 12, the head rest main body 4 is moved in the vertical direction from the sole stay 2 and rail 5, because the nut 10 which is engaged with the screw 9 is fixed to the sole stay 2 through the rail 5. Therefore, the height or vertical position of the head rest main body 4 is adjusted relative to the seat back 1.

When a load in the direction C or B is applied to the head rest main body 4, the guide member 6 moves relative to the rail 5 so as to elastically distort the cushion 11. The load is thus absorbed and fails to affect the sole stay 2. Accordingly, sole stay 2 alone is sufficient to support the head rest main body 4 on the seat back 1.

Further, a warp or change to any degree in the parallel position of the guide rods 8 and screw 9 can be absorbed by the sliding movement of the guide member 6 and the distortion of the cushion 11. Therefore, a smooth movement of the head rest main body 4 can be established. Since, the supporting stiffness of the head rest main body 4 relative to the seat back 1 is established by the pair of guide members 6 and pair of guide rods 8, a play of the head rest main body 4 relative to the seat back 1 can be kept as small as possible.

Obviously, numerous modifications and variations of the present invention are possible in light of the above teachings. It is therefore to be understood that within the scope of the appended claims, the invention may be practiced otherwise than as specifically described herein.

What is claimed is:

1. A head rest apparatus provided to a seat back, comprising:
    a main body having a horizontal dimension and a vertical dimension;
    rail means including a rail having an end portion with a first hole means and an intermediate portion with a second hole means, the rail extending in the direction of the horizontal dimension of the main body;
    a sole stay extending from a portion of the seat back in parallel with and secured to the rail means;
    a guide member mounted on the rail means movable relative to the rail in the direction of the horizontal dimension;
    a rod extending through the first hole means with clearance between the rod and perimeter of the first hole means, the rod being secured to the main body and movable relative to the guide member;
    a screw rotatably mounted to the main body extending in the direction of the vertical dimension through the second hole means with clearance between the screw and perimeter of the second hole means;
    a nut fixedly mounted to the rail means through elastic means and threadably engaging the screw; and
    a motor secured to the main body and the screw for rotating the screw relative to the nut.

2. A head rest apparatus in accordance with claim 1, wherein the rail has a U-shaped configuration in cross section with a pair of walls spaced in the direction of the vertical dimension, the first hole means includes a pair of holes spaced in the direction of the vertical dimension formed in the walls, the second hole means includes a pair of holes spaced in the direction of the vertical dimension formed in the walls, and the elastic means includes elastic material disposed between the nut and opposing walls of the rail.

3. A head rest apparatus in accordance with claim 1, wherein the motor is an ultrasonic motor.

4. A head rest apparatus in accordance with claim 1, wherein the portion of the seat back is a portion extending from a top of the seat back.

5. A head rest apparatus in accordance with claim 1 further comprising a stopper spaced from the guide member in the direction of the horizontal dimension.

6. A head rest apparatus provided to a seat back comprising:
    a main body having a horizontal dimension and a vertical dimension;
    rail means, including a rail having one end portion with a first hole means, an intermediate portion with a second hole means, an opposite end portion with a third hole means, the rail extending in the direction for the horizontal dimension in the main body;
    a sole stay extending from a portion of the seat back in parallel with and received on the rail means;
    a pair of guide members mounted on the rail means to be movable relative to the rail in the direction of the horizontal dimension;
    a pair of rods secured to and extending in the main body, movably mounted relative the respective one of the pair of guide members, and passing through the first hole means and the third hole means, respectively, with a clearance between the rods and perimeter of the respective first and third hole means;
    a screw extending in the direction of the vertical dimension, rotatably mounted in the main body, and passing through the second hole means with a clearance between the screw and perimeter of the second hole means;
    a nut fixedly mounted in the rail means through elastic means and threadably engaging with the screw; and
    a motor secured to the main body and the screw for rotating the screw relative to the nut.

* * * * *